United States Patent
Grönberg et al.

(10) Patent No.: US 7,450,540 B2
(45) Date of Patent: Nov. 11, 2008

(54) METHOD AND SYSTEM OF ENHANCED DUAL TRANSFER MODE USING MOBILITY MANAGEMENT

(75) Inventors: Petri Grönberg, Nokia (FI); Antti O. Kangas, Oulunsalo (FI)

(73) Assignee: Nokia Corporation, Espoo (FI)

( * ) Notice: Subject to any disclaimer, the term of this patent is extended or adjusted under 35 U.S.C. 154(b) by 386 days.

(21) Appl. No.: 11/140,494

(22) Filed: May 27, 2005

(65) Prior Publication Data

US 2005/0276244 A1   Dec. 15, 2005

Related U.S. Application Data

(60) Provisional application No. 60/580,204, filed on May 27, 2005.

(51) Int. Cl.
*H04Q 7/00* (2006.01)
(52) U.S. Cl. .............. 370/328; 370/310; 370/311; 455/552.1; 455/567
(58) Field of Classification Search ............ 370/328, 370/352, 331, 310, 311; 455/436, 552.1, 455/560, 554.1, 567
See application file for complete search history.

(56) References Cited

U.S. PATENT DOCUMENTS

| | | | |
|---|---|---|---|
| 2002/0085516 A1* | 7/2002 | Bridgelall | 370/329 |
| 2002/0137532 A1 | 9/2002 | Landais et al. | |
| 2003/0139184 A1* | 7/2003 | Singh et al. | 455/436 |
| 2003/0218995 A1* | 11/2003 | Kim et al. | 370/318 |
| 2004/0072593 A1* | 4/2004 | Robbins et al. | 455/560 |
| 2004/0073928 A1* | 4/2004 | Alakoski et al. | 725/62 |
| 2004/0097267 A1* | 5/2004 | Pecen et al. | 455/560 |
| 2004/0184439 A1* | 9/2004 | Blanc et al. | 370/349 |
| 2004/0266426 A1* | 12/2004 | Marsh et al. | 455/426.2 |

OTHER PUBLICATIONS

3GPP TS 43.055 v6.4.0 (Feb. 2004); 3rd Generation Partnership Project; Tech. Spec Group GSM/EDGE; Radio Access Network; Dual Transfer Mode; Stage 2 (Release 6).
3GPP TSG GERAN Meeting #20, Bilbao, Spain, Jun. 21-25, 2004, Tdoc GP-041487, Agenda Item 7.2.5.5, DTM Co-ordination Enhancement.
3GPP TS 43.055 v5.2.0 (Aug. 2003), 3rd Generation Partnership Project; Tech. Specification Group GSM/EDGE; Radio Access Network; Dual Transfer Mode, Stage 2 (Release 5).
3 GPP TS 23.060 v5.6.0 (Jun. 2003), 3rd Generation Partnership Project; Tech. Specification Grp Svcs and System Aspects; General Packet Radio Service (GPRS); Service Description.

* cited by examiner

Primary Examiner—Danh C Le

(57) ABSTRACT

A method, system, and mobile station are presented for informing a packet control unit (PCU) whether the dual transfer mode (DTM) capable mobile station has an ongoing circuit switched connection and is in dedicated mode. The packet control unit will typically be located at a base station. Upon entering the dedicated mode, the mobile station alerts the PCU of entry into the dedicated mode, using a mobility management (MM) procedure. This mobility management procedure is utilized for alerting the PCU about the dedicated mode, regardless of physical movement of the mobile station such as movement from one cell to another.

24 Claims, 4 Drawing Sheets

METHOD AND SYSTEM OF ENHANCED DUAL TRANSFER MODE USING MOBILITY MANAGEMENT

CROSS-REFERENCE TO RELATED APPLICATION

This application claims priority to U.S. provisional application 60/580,204 filed May 27, 2005.

FIELD OF THE INVENTION

The present invention relates to wireless telecommunication, and in particular to a mobile station that can communicate in a packet switched environment as well as a circuit switched environment.

BACKGROUND OF THE INVENTION

The present invention relates to wireless communication devices such as mobile phones. The first Global System for Mobile (GSM) communication networks were designed for voice services rather than for data services. When the use of GSM data services started, it soon became evident that the Circuit Switched (CS) bearer services were not well-suited for certain types of applications with a bursty nature. Therefore the new Packet Switched (PS) data transmission service GPRS (General Packet Radio Service) was developed for packet services. GPRS is a packet radio network utilizing the GSM network, and GPRS endeavours to optimize data packet transmission by means of GPRS protocol layers on the air interface between a mobile station (hereinafter also called a mobile terminal) and a GPRS network.

A GPRS mobile station (MS), also called a mobile terminal, can operate in one of three modes of operation, as described in 3GPP TS 23.060, "Service description; Stage 2," Section 5.4.5. This document 3GPP TS 23.060, v 5.6.0, General Packet Radio Service (GPRS), Service Description is useful for understanding the context of the present invention, in addition to 3GPP TS 43.055, v 5.2.0, Radio Access Network, Dual Transfer Mode.

The three modes are Class-A Mode, Class-B Mode, and Class-C Mode. According to the Class-A mode of operation, the MS is attached to both GPRS as well as other GSM services, and therefore Class-A Mode corresponds to Dual Transfer Mode (DTM) (hereinafter also called dual mode). The mobile user in Class-A Mode can make and/or receive calls on the two services simultaneously, for example having a normal GSM voice call and receiving GPRS data packets at the same time. According to the Class B mode of operation, the MS is attached to both GPRS and other GSM services, but the MS can only operate one set of services at a time. According to the Class C mode of operation, the MS can only be attached either to the GSM network or the GPRS network; the selection is done manually and there are no simultaneous operations.

Based on the current standard (3GPP TS 44.018, "Radio Resource Control Protocol"), when the MS releases a CS connection (also referred to as a radio resource or RR connection) while in the Dual Transfer Mode (DTM), all packet resources are aborted. This is illustrated in FIG. 1 (also see 3GPP TS 43.064, "Overall description of the GPRS radio interface; Stage 2"), which shows RR operating modes and transitions between Class-A (DTM supported) and Class-B. An RR Release moves the MS from the Dual Transfer Mode 102 into an Idle/Packet Idle state 104, after which the MS must then obtain packet access in order to perform packet transfer. In other words, after the release of the CS connection, the MS is in the packet idle mode and must perform a complete acquisition of system information and ask for PS resources again, in order to get into the Packet Transfer Mode 106.

In any GSM network, there will be several BSCs (Base Station Controllers). When implementing GPRS, a software and hardware upgrade of this unit is required. The hardware upgrade consists of adding a Packet Control Unit (PCU). This extra piece of hardware differentiates data destined for the standard GSM network or Circuit Switched Data and data destined for the GPRS network or Packet Switched Data. In some cases a PCU can be a separate entity.

According to the current GSM/GPRS standardization, a mobile station (MS) can have a GSM circuit switched (CS) speech connection and a GPRS/EGPRS packet switched (PS) data connection simultaneously in active use only if one of the following is true: the MS represents a "class A" GPRS mobile that can handle both CS and PS connections simultaneously without radio resource coordination between the CS and PS domains; or the MS and the network support the Dual Transfer Mode (DTM) feature that provides radio resource coordination between the CS and PS domains.

The implementation of a "Class A" mobile station would basically require a mobile terminal with two radio parts, resulting in a high development cost, which mobile manufacturers would like to avoid. Nevertheless, there is a clear need for this type of mobile device that can have a GSM circuit switched (CS) speech connection and a GPRS/EGPRS packet switched (PS) data connection simultaneously in active use, because some services demand the simultaneous existence of a CS connection and a PS data transfer. This fact has given a strong impetus for the "class B" DTM feature implementation.

DTM is a standardized feature that provides simultaneous GSM/GPRS service for GPRS/EGPRS mobile stations in a coordinated manner. In other words, a DTM-capable MS can have a CS speech connection as well as a PS data transfer ongoing at the same time if the radio timeslots allocated in each direction are contiguous and within the same frequency. This kind of radio resource coordination between the CS and PS resource allocations should be provided by the network that supports the DTM functionality.

Current DTM-specifications state that the dual transfer mode (i.e. the DTM mode where the MS is having a CS and a PS radio resource at the same time) can be entered only from dedicated mode, which is the mode where the MS is having a CS connection. This means that the DTM resource coordination is especially needed in a situation where a PS data connection needs to be established for a DTM-capable MS that happens to be in dedicated mode.

In the GSM/GPRS networks it is the Base Station Subsystem (BSS) that takes care of radio resource management functions. However, the CS and PS radio resources are managed by different network entities: the directory exchange (DX) takes care of CS radio resources and the Packet Control Unit (PCU) takes care of PS radio resources.

From the BSS perspective, the PCU has to know whether the MS happens to have a CS connection ongoing or not when there is a need for a PS data transfer. If the MS is not having a CS connection, then normal PS data transfer procedures can be applied. However, if the MS has an ongoing CS connection, then DTM-specific data transfer procedures are needed. This means that the DX and the PCU need to communicate with each other so that information about the DTM mobiles' resource allocations can be shared between the PS and CS domains. This requires internal signaling at the BSS. The main problem with this existing technology is that the PCU has to know whether a DTM-capable MS happens to have a CS connection ongoing or not, when there is a need for a PS data transfer. When a PS data transfer is established in the uplink (UL) direction, then there is no problem. If the MS has a CS connection ongoing, then it uses a DTM-specific channel request message when it requests a PS radio resource. Based on this message the network knows that DTM resource coordination is needed.

In the downlink (DL) direction, however, the PCU may receive data packets addressed to a DTM-capable MS whose current mode (dedicated mode or idle mode) is not known. There are two straightforward prior art means to find out the mode of the MS: (I) the PCU asks the DX, when needed, whether the MS is in dedicated mode; or (II) the DX informs the PCU whenever a DTM-capable MS enters or leaves dedicated mode so that the PCU can keep a record about all DTM mobiles that are having a CS connection within a given network area.

The problem with the first method (I) is that the PCU has to make such queries very often, because a PS data transfer establishment is a very frequent procedure and also because the PCU cannot really know whether the MS is in dedicated mode or in idle mode. On the other hand, it is rather improbable that a MS will happen to have a CS connection ongoing when a data packet arrives at the PCU (a typical traffic load generated by a GSM subscriber is 25 mErl, meaning that the subscriber is having a speech connection active only 2.5% of the time).

The problem with the second method (II) is that the DX does not know whether the MS is even attached to the GPRS network. Therefore, the DX has to inform the PCU about all DTM-capable mobiles. As a result, the DX has to send a large amount of information messages to the PCU, because the CS connection establishment and release procedures are very common procedures at the BSS. On the other hand, it is rather improbable that a MS will receive any data packets during the CS connection; most of the mobiles are not even attached to the GPRS network when they are using the CS speech service.

In other words, the BSS has to perform DTM coordination for all DTM-capable mobile stations even if only a small minority of the DTM mobiles are really applying the DTM functionality (that is, having a CS and a PS connection in active use at the same time). This type of DTM coordination will generate a considerable signaling load within the BSS when the penetration of DTM-capable mobiles increases in the GSM networks.

If we assume that the mean GSM call holding time is 120 seconds, then we may estimate that a BSS with a CS traffic handling capacity of 4000 Erl generates about 2*4000/120 s≈70 CS call establishment and release procedures per second. If the DTM penetration is 80%, then in the second solution (II) the DX has to send about 50 DTM coordination messages per second to the PCU—and most of the messages are sent in vain.

It is well known for wireless networks to use mobility management (MM) in order to keep track of the position of a mobile station (MS). MM employs a combination of wireless hardware and associated subscriber information. Because a mobile station is often moving from one place to another, the network must be aware of the MS's position in order to maintain connectivity. Mobility management refers to the range of procedures that make this possible. These include identification and authentication of the mobile subscriber, security, access to wireless services, transfer of subscriber data among network nodes, location updating, and registration. Unfortunately, MM procedures have not been employed with respect to communications between a DX and PCU, or with respect to an MS's movement in and out of a DTM dedicated mode, which of course can occur even when an MS is perfectly still (i.e. not changing position).

Another problem with the DTM functionality is that when the MS needs to establish a CS connection (e.g. a speech call) when it has active packet data transfer ongoing, the MS releases the packet connection without any signaling to the network, and establishes the CS connection in the random access control channel (RACH). At this stage, the point of view of the PCU is that the MS has disappeared from the allocated packet resources, and the PCU issues a RADIO STATUS message towards the serving GPRS support node (SGSN). In case the MS has no uplink GPRS data to transmit to the network, the data flow in the downlink direction will be halted even though the MS and the network are DTM-capable. These and other problems of the existing art can be solved by the present invention.

SUMMARY OF THE INVENTION

In dual transfer mode (DTM), the packet control unit (PCU) has to know whether a DTM mobile station (MS) is in dedicated mode when a downlink (DL) packet transfer needs to be established for the MS. This requires a great deal of base station controller (BSC) internal signaling, if the penetration of the DTM mobiles is high. The present invention enables this DTM coordination to only those mobile stations that really are attached to both circuit switched (CS) and packet switched (PS) services, meaning that the BSC internal signaling load can be reduced considerably.

According to this invention, the base station subsystem (BSS) can utilize mobility management (MM) procedures of GPRS or enhanced GPRS (EGPRS), in order to determine which DTM mobiles are really using the GPRS service during the time when the DTM MS has a CS connection. Mobility management (MM) is a term denoting the mobility functions provided by a Public Land Mobile Network such as GSM. Such functions will include tracking a mobile station as it moves around a network, and ensuring that communication is maintained.

This is possible if, for example, the DTM-capable mobile stations support the following additional MM procedure: when a DTM MS enters dedicated mode while being in an MM Ready state, then the MS performs a cell update procedure even if the MS has not changed the cell.

Whenever a DTM-capable MS enters dedicated mode, it informs the BSS if it is in MM Ready state. Based on this information, the BSS can perform DTM coordination only for those DTM mobile stations that are (or have been) in MM Ready state during the CS connection. This scenario is possible if the DTM-capable mobile station supports one of the following procedures:

PROCEDURE A: When a DTM MS enters dedicated mode while being in MM Ready state, then the MS shall perform a cell update procedure even if the MS has not changed the cell.

PROCEDURE B: When a DTM MS enters dedicated mode while being in MM Ready state, then the MS shall send to the BSS a GPRS SUSPENSION REQUEST message with an extension (a non-DTM MS that is attached to GPRS service sends this message when entering dedicated mode). The extension indicates to the BSS that the DTM MS is not actually suspending the GPRS service but only informing the BSS that it is in GPRS mobility management (GMM) Ready state.

PROCEDURE C: When a DTM MS enters dedicated mode while being in MM Ready state, then the MS shall send to the BSS a GPRS INFORMATION message (this message is used to carry GTTP signaling messages) without an LLC PDU or with a dummy LLC PDU. This is achieved by either extending this message or by encoding the existing message content in a specific way. This message is used for the purpose of informing the BSS that the MS is in GMM Ready state.

PROCEDURE D: When a DTM MS enters dedicated mode while being in MM Ready state, then the MS shall send to the BSS a GPRS DTM INFORMATION message. This is a new message that is used in the purpose of informing the BSS that the MS is in GMM Ready state.

Using any one of these four related procedures, it becomes possible for the BSS to perform DTM coordination only for those DTM mobile stations that are (or have been) in GMM Ready state during the CS connection. In addition, in the case of suspended downlink GPRS data transfer, using the cell update procedure by sending an LLC PDU to the network when an DTM-capable MS in GMM ready state enters dedicated mode in a cell supporting DTM, the network is able to continue the downlink GPRS data traffic immediately after the cell update procedure has been completed.

DETAILED DESCRIPTION OF THE INVENTION

Figure 1:
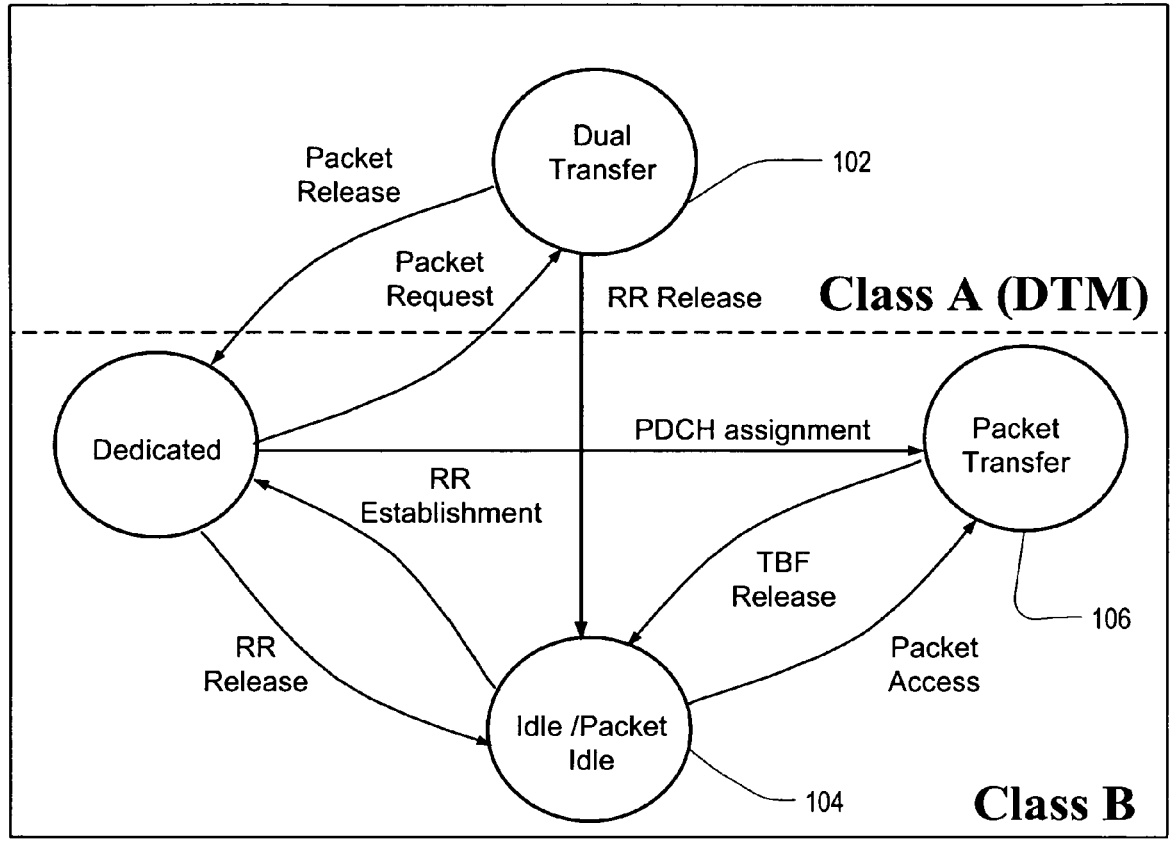
FIG. 1 shows a prior art system for a DTM mobile station to move from one mode to another.

Here it is assumed that all the DTM mobiles support one of the four procedures A, B, C, or D summarized above. In any of these cases, the optimal method for DTM coordination can be implemented.

By default, the DX does not inform the PCU about the DTM-capable mobiles that are having a CS connection. However, if a DTM MS performs a DTM-specific procedure during the CS connection, then the DX informs the PCU about the MS.

This kind of DTM-specific procedure can be (a) a GPRS Transparent Transport Protocol (GTTP) message which is used when the MS needs to transmit a GPRS MM message, for example a cell update, to the network while being in dedicated mode; or (b) a DTM channel request message which is used when the MS needs to establish a PS data transfer in the uplink (UL) direction while having a CS connection; or (c) a GPRS SUSPENSION REQUEST message with an extension that indicates that the MS in is GMM Ready state; or (d) a GPRS INFORMATION message without an LLC PDU or with a dummy LLC PDU; or (e) a GPRS DTM INFORMATION message that indicates that the MS in is GMM Ready state. The coordination message, that is sent from the DX to the PCU, identifies the mobile station (IMSI can be used in this context) and indicates if the MS is currently having a CS connection. The message may also contain information about the current cell and/or the radio access capabilities of the MS.

The DX has to remember which DTM mobiles the PCU has been informed about so that the DX is able to inform the PCU when such a MS leaves dedicated mode due to a CS call release or due to an inter-cell handover procedure.

When the PCU receives a coordination message that indicates that a given MS is having a CS connection, the PCU makes a record for the mobile. Respectively, when the PCU receives a coordination message that indicates that a given MS has left dedicated mode meaning that the CS connection has been released, the PCU removes the corresponding record from its memory.

Based on this record the PCU is able to detect if the MS is having a CS connection when the PCU receives a request to establish a PS data transfer for the MS in DL direction. Note that this kind of DTM coordination covers all relevant cases:

CASE 1: The MS establishes a CS connection while being in MM Ready state. In this case the MS shall use one of the new procedures described above. This will trigger a DTM coordination message that is sent from the DX to the PCU. Based on this message the PCU is able to detect that the MS is having a CS connection when the PCU receives a request to establish a PS data transfer for the MS in DL direction.

CASE 2: The MS establishes a CS connection while being in MM Standby state. In this case the MS does not perform any DTM-specific procedure and the PCU is not informed about the MS. Note that in this case the PCU does not need to know the mode of the MS because the GPRS core network cannot send data packets for the MS without a PS paging procedure. This is because the MS is in MM Standby state.

CASE 3: The MS moves from MM Standby state to MM Ready state during the CS connection. Such a change in the MM state is triggered only if the MS transmits a data packet to the network. In this case the MS has to apply a DTM-specific procedure (a GTTP message or a request for DTM call establishment). This will trigger a DTM coordination message that is sent from the DX to the PCU. Based on this message the PCU is able to detect that the MS is having a CS connection when the PCU receives a request to establish a PS data transfer for the MS in DL direction.

CASE 4: The MS moves from MM Ready state to MM Standby state during the CS connection. In this case, no DTM coordination messages are needed. The PCU can still keep the record for the MS until the DX sends another coordination message that indicates that the MS has left dedicated mode due to a CS call release or due to an inter-cell handover procedure.

CASE 5: The mobile station's CS connection is handed over to another cell. In this case the DX can inform the PCU that the MS has left dedicated mode in the source cell. If the MS is still in MM Ready state it will perform a cell update procedure in the target cell (this is required by the existing MM procedures). This can be done only by applying a DTM-specific procedure (a GTTP message or a request for DTM call establishment) which triggers a new DTM coordination message that is sent from the DX to the PCU. If the MS is no more in MM Ready state, then PCU does not need to know the mode of the MS.

CASE 6: The MS is in MM Standby state and the GPRS core network generates a PS paging request for the MS. In this case the PCU does not usually know the mode of the MS. Therefore, the PCU shall send the PS paging request to the DX which will then determine whether the given IMSI is having a CS connection or not. If the MS happens to be in dedicated mode, then the PS paging request needs to be sent to the MS on the signalling channel of the CS connection (this is a Packet Notification procedure known in the prior art). If the MS does not have a CS connection, then the MS needs to paged on the GPRS paging channel. Note that the MS responds to the PS paging request by sending a data packet to the network. If the MS is having a CS connection, this can be done only by applying a DTM-specific procedure which triggers again a DTM coordination message that is sent from the DX to the PCU. Based on this message the PCU knows the mode of the MS when the data transfer in DL direction needs to be established. Also, note that in the current BSS implementation the PS paging request needs to be sent from the PCU to the DX in every case. Therefore, this paging procedure does not increase the signaling load on the DX-PCU interface.

Now a sub-optimal implementation alternative will be described, which assumes that only part of the DTM mobiles support the new DTM procedure described above (due to the possibility that this enhancement is not accepted as mandatory requirement from all DTM mobiles, i.e. starting from R99 but instead as an enhancement to a later release such as REL-6, however the enhancement being applicable for also earlier revisions of DTM mobile stations, depending on the implementation)

Those DTM mobiles that support the new DTM procedure shall indicate this capability in the MS Radio Access Capabilities information element (this information element contains information about the mobile's radio access capabilities and the network allocates radio resources for the MS based on this information).

In this sub-optimal case, the DTM coordination can be implemented as follows. By default, the DX does not inform the PCU about the DTM-capable mobiles that are having a CS connection. However, if a DTM MS performs a DTM-specific procedure during the CS connection, then the DX informs the PCU about the MS.

As already described above with respect to a more optimal embodiment, this kind of DTM-specific procedure can be (a) a GPRS Transparent Transport Protocol (GTTP) message which is used when the MS needs to transmit a GPRS MM message, for example a cell update, to the network while being in dedicated mode; or (b) a DTM channel request message which is used when the MS needs to establish a PS data transfer in the uplink (UL) direction while having a CS connection; or (c) a GPRS SUSPENSION REQUEST message with an extension that indicates that the MS in is GMM Ready state; or (d) a GPRS INFORMATION message without an LLC PDU or with a dummy LLC PDU; or (e) a GPRS DTM INFORMATION message that indicates that the MS in is GMM Ready state. The coordination message, that is sent from the DX to the PCU, identifies the mobile station (IMSI can be used in this context) and indicates if the MS is currently having a CS connection. The message may also contain information about the current cell and/or the radio access capabilities of the MS.

The DX has to remember which DTM mobile stations the PCU has been informed about, so that the DX is able to inform the PCU when such a MS leaves dedicated mode. When the PCU receives a coordination message that indicates that a given MS is having a CS connection, the PCU makes a record for the mobile. When the PCU receives a coordination message that indicates that a given MS has left dedicated mode, meaning that the CS connection has been released, the PCU respectively removes the corresponding record from its memory.

When the PCU receives a request to establish a PS data transfer for a DTM-capable MS in DL direction, the PCU first checks whether it has a record for the MS. If the PCU has a record for the MS, then DTM-specific procedures are needed in order to establish a DL data transfer for the MS. However, if the PCU does not have a record for the MS, then the PCU checks whether the MS supports the new DTM procedure.

If the MS supports the new DTM procedure, then the PCU may conclude that the MS is not having a CS connection. Therefore, the normal (non-DTM) GPRS procedures can be applied when the DL data transfer is established for the MS. However, if the MS does not support the new DTM procedure, then the PCU asks DX whether the MS is having a CS connection. The DL data transfer is then established based on the DXs respond.

Using these DTM coordination methods, the BSS is able to reduce the internal signaling load between the DX and the PCU considerably. Without this invention, the signaling load could be of the order of 70 messages per second if the BSS has a CS traffic handling capacity of 4000 Erl and if the penetration of DTM mobiles is 80%.

With the optimal implementation alternative, the respective signaling load could be approximately 2 to 5% of the original load, or about 1-3 signaling messages per second. With the sub-optimal implementation alternative the respective signaling load could be, say, 10 to 80% of the original load, depending upon the penetration of DTM mobiles supporting the new DTM procedure.

The disadvantage of the DTM procedure where the MS performs an additional cell update is that the MS that enters dedicated mode while being in the MM Ready state resets the Ready timer when a cell update is performed. This lengthens the time during which the MS is in Ready state. It is assumed, however, that the case where the MS enters dedicated mode while being in MM Ready state is quite uncommon, meaning that the negative effect of this feature is marginal.

A second sub-optimal solution will now be described. Those DTM mobile stations that support the new DTM procedure indicate this capability in a mobile station classmark information element (MS CLASSMARK IE). The MS classmark contains one or more information elements that describe the capabilities of the MS to the network. When a DTM mobile station (MS) enters dedicated mode, the directory exchange (DX) checks from the MS CLASSMARK IE whether the mobile station supports this new DTM procedure. If the DTM mobile station supports the new DTM procedure, then by default the DX does not inform the packet control unit (PCU) about the DTM-capable mobile stations that are having a circuit-switched (CS) connection. However, if a DTM mobile station performs a DTM-specific procedure during the CS connection, then the DX informs the PCU about the mobile station. If the DTM mobile station does not support the new DTM procedure, then the DX informs the PCU about the mobile station. Based on the record, the PCU is able to detect if the MS has a CS connection when the PCU receives a request to establish a packet switched (PS) data transfer for the MS in the download (DL) direction.

Note that the step of informing the PCU can be considered as a two-step procedure. First, the MS Sends the GPRS sends the GPRS INFORMATION or some other message to the DX, using the signaling link related to the CS connection. Then, the DX sends a further message or alert to the PCU.

Figure 2:
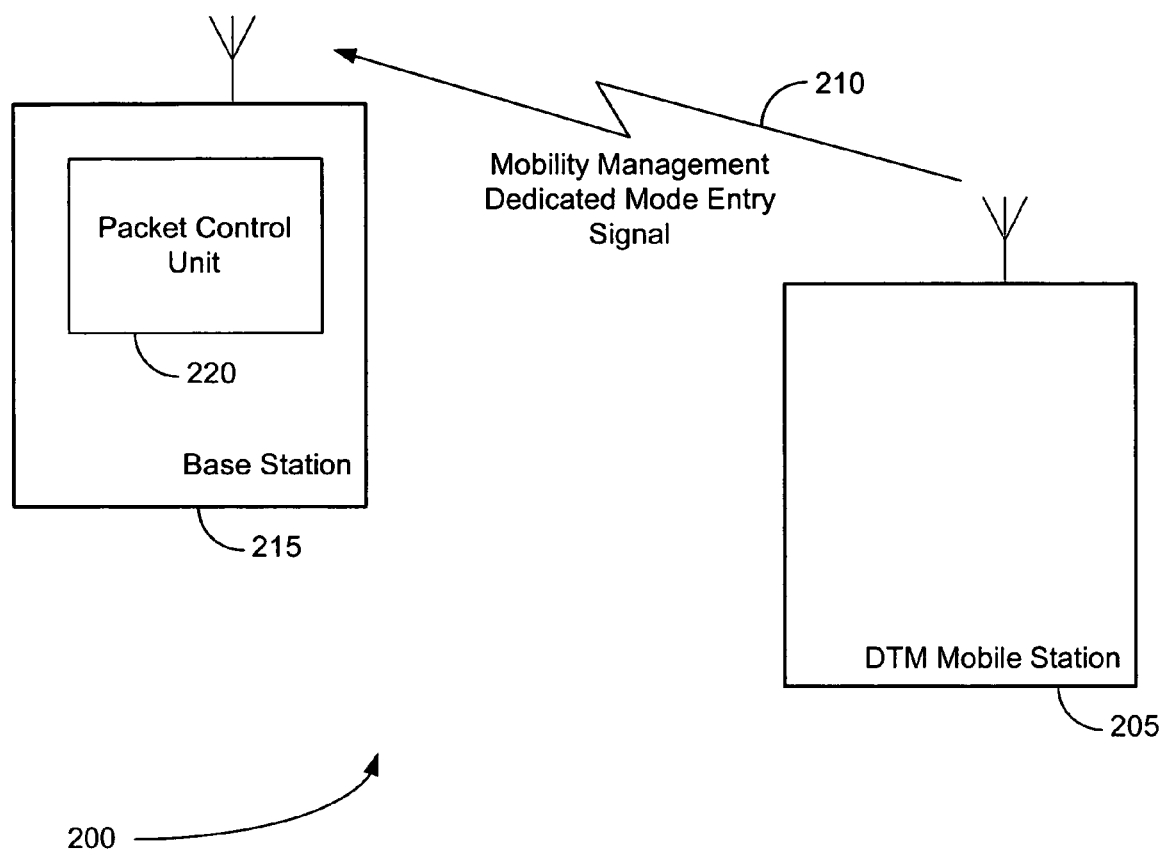
FIG. 2 illustrates a system according to an embodiment of the present invention.

FIG. 2 shows a system 200 according to an embodiment of the present invention, in which a DTM mobile station 205 enters dedicated mode, and therefore sends a mobility management dedicated mode entry signal 210 to a base station 215. In FIG. 2, the base station includes a packet control unit 220.

Figure 3:
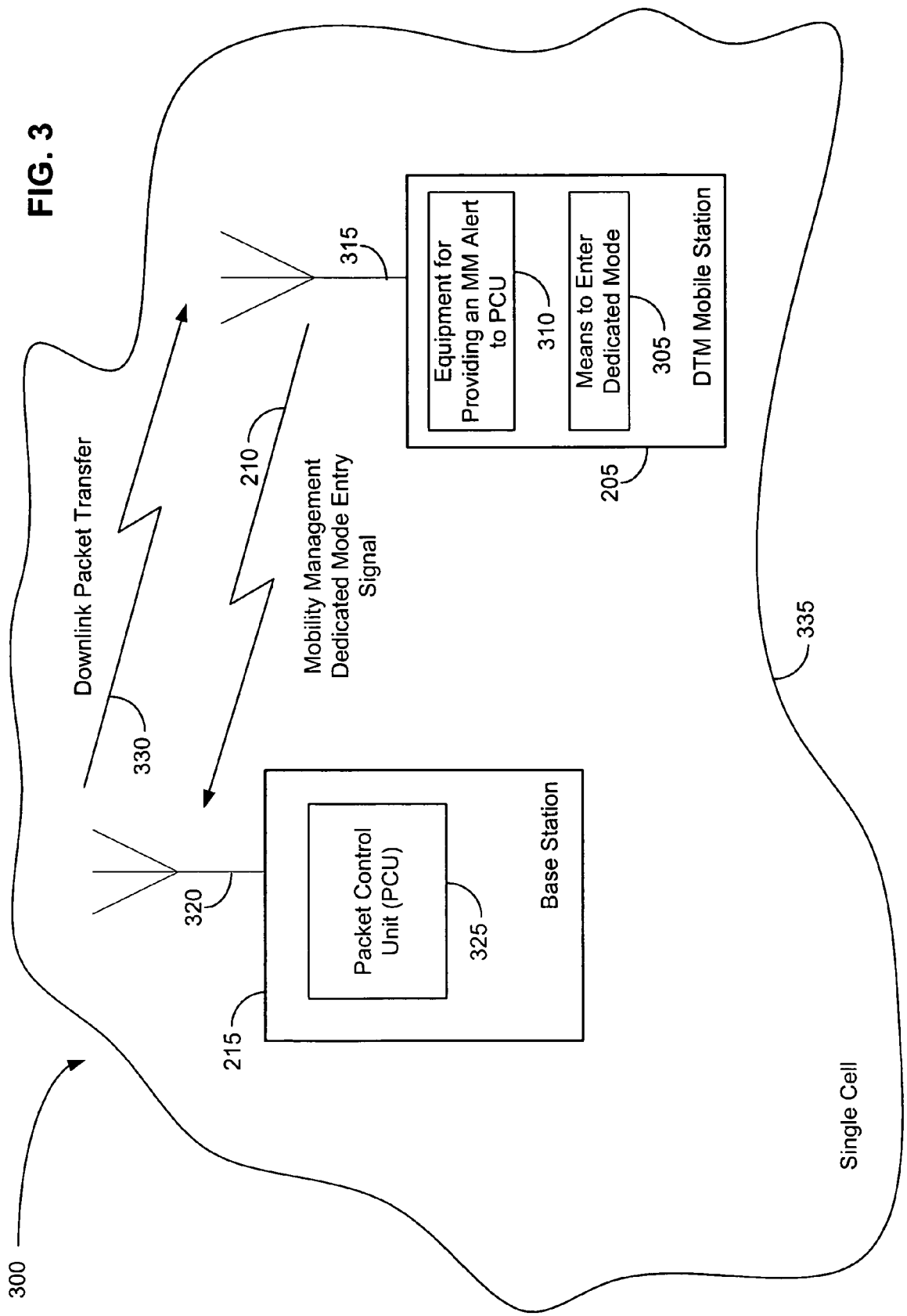
FIG. 3 shows a somewhat more detailed system according to an embodiment of the present invention.

FIG. 3 shows with somewhat greater detail a system 300 according to an embodiment of the present invention, in which a DTM mobile station 205 utilizes a means 305 for entering dedicated mode, and therefore equipment 310 sends a mobility management dedicated mode entry signal 210 via transceivers 315 and 320 to a base station 215. In FIG. 3, the base station includes a packet control unit 305 which then enables a downlink packet transfer 330 back to the mobile station 205. All of this takes place within a cell 335.

Figure 4:
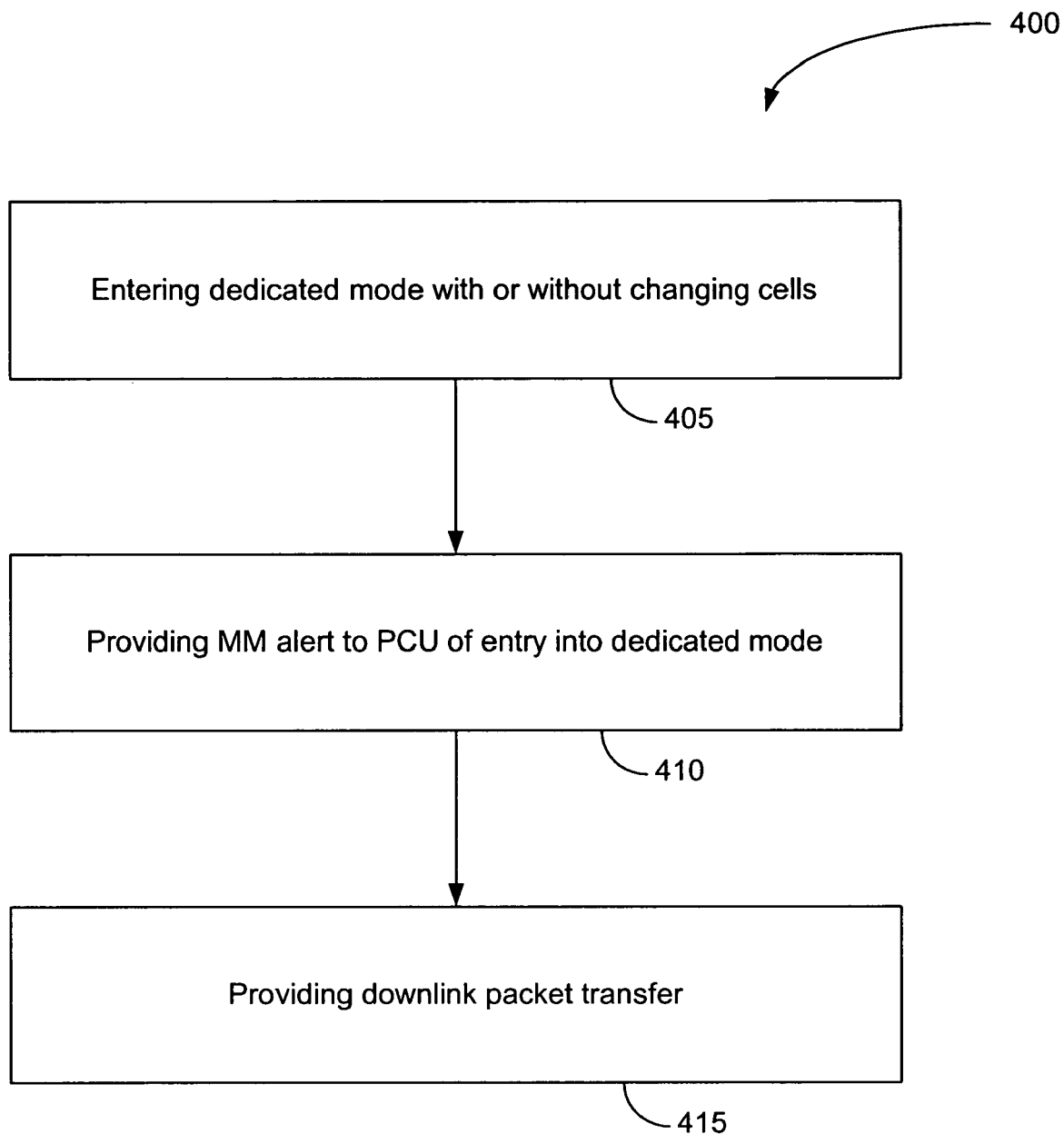
FIG. 4 is a flow chart illustrating an embodiment of the present invention.

FIG. 4 outlines a method 400 according to an embodiment of the present invention. A dedicated mode is entered 405, with or without changing cells. Consequently, a mobility management (MM) alert is provided 410 to a packet control unit (PCU). Lastly, a downlink packet transfer is then provided 415.

It is to be understood that all of the present figures, and the accompanying narrative discussions of best mode embodiments, do not purport to be completely rigorous treatments of the invention under consideration. A person skilled in the art will understand that the steps and signals of the present application represent general cause-and-effect relationships that do not exclude intermediate interactions of various types, and will further understand that the various steps and conceptual structures described in this application can be implemented by a variety of different combinations of hardware and software which need not be further detailed herein.

What is claimed is:

1. A method, comprising:
    entering a dedicated mode in which a dual transfer mode capable mobile station is in a mobility management ready state and has a circuit switched connection to a network; and
    alerting a packet control unit and a serving support node of entry into the dedicated mode, using a mobility management procedure,
    wherein said packet control unit and said serving support node are in the network, which supports the dual transfer mode,
    wherein said dual transfer mode is a mode in which the mobile station may use a circuit switched and a packet switched radio resource substantially simultaneously, and
    wherein said packet control unit is a unit that substantially manages packet switched data instead of circuit switched data.

2. The method of claim 1:
    wherein the serving support node is alerted about the ongoing circuit switched connection subsequent to alerting the packet control unit, and
    wherein the method further comprises performing dual transfer mode coordination only for mobile stations that are, or have been, in the mobility management ready state during said circuit switched connection.

3. The method of claim 2,
    wherein the alerting is performed by a mobility management cell update procedure even if the mobile station in ready state is not changing the cell.

4. A computer readable medium encoded with a software data structure sufficient for performing the method of claim 1.

5. The method of claim 1, wherein, in the dedicated mode, the mobile station is attached to both a general packet radio service and the circuit switched connection.

6. The method of claim 1, further comprising providing a message that the mobile station has left dedicated mode, so that said alerting will no longer be on record,
    wherein said type of data transfer procedure also depends on whether said alerting is on record.

7. The method of claim 1, wherein said alerting is accomplished using said dedicated mode.

8. The method of claim 1, wherein a type of data transfer procedure depends at least on whether said alerting has occurred.

9. A system, comprising:
    a packet control unit; and
    a mobile station having dual transfer mode capability, said mobile station configured to enter a dedicated mode in which said mobile station is in a mobility management ready state and has a circuit switched connection;
    wherein the mobile station is equipped to alert the packet control unit and a serving support node regarding entry into the dedicated mode, using a mobility management procedure, at least if the system supports the dual transfer mode
        wherein said dual transfer mode is a mode in which the mobile station may use a circuit switched and a packet switched radio resource substantially simultaneously, and
        wherein said packet control unit is a unit that substantially manages packet switched data instead of circuit switched data.

10. The system of claim 9, wherein the mobile station is located in a cell covered by the base station, and wherein the system is operative without movement to another cell.

11. The system of claim 9, wherein, in the dedicated mode, the mobile station is attached to both a general packet radio service and the circuit switched connection.

12. The system of claim 9, wherein the packet control unit is responsive to the alert by establishing a downlink packet transfer in dual transfer mode if the mobile station is in the dedicated mode instead of an idle mode and if there is a need for downlink packet transfer.

13. An apparatus comprising:
    a module configured to enter a dedicated mode in which the apparatus is in a mobility management ready state and has a circuit switched connection, said apparatus having dual transfer mode capability; and
    a module configured to alert a packet control unit and a serving support node regarding entry into the dedicated mode, using a mobility management procedure, at least if said packet control unit and said serving support node are in a network supporting the dual transfer mode,
    wherein said dual transfer mode is a mode in which the apparatus uses a circuit switched and a packet switched radio resource substantially simultaneously, and
    wherein said packet control unit is a unit that substantially manages packet switched data instead of circuit switched data.

14. The apparatus of claim 13, wherein the alerting module is further configured to alert the serving support node, regarding entry into the dedicated mode, subsequent to alerting the packet control unit.

15. The apparatus of claim 13, wherein the module for alerting a packet control unit is operative without movement to another cell.

16. The apparatus of claim 13, wherein, in the dedicated mode, the apparatus is attached to both a general packet radio service and the circuit switched connection.

17. The apparatus of claim 13, further comprising a receiving device configured to receive or resume a downlink packet transfer if the apparatus is in the dedicated mode instead of an idle mode.

18. The apparatus of claim 13, wherein said apparatus is a mobile station.

19. An apparatus comprising:
    means for entering a dedicated mode in which the apparatus is in a mobility management ready state and has a circuit switched connection, said apparatus having dual transfer mode capability; and
    means for alerting a packet control unit and a serving support node regarding entry into the dedicated mode, using a mobility management procedure, at least if said packet control unit and said serving support node are in a network supporting the dual transfer mode, wherein said dual transfer mode is a mode in which the apparatus uses a circuit switched and a packet switched radio resource substantially simultaneously, and wherein said packet control unit is a unit that substantially manages packet switched data instead of circuit switched data.

20. The apparatus of claim 19, wherein the means for alerting is for alerting the serving support node, regarding entry into the dedicated mode, subsequent to alerting the packet control unit.

21. The apparatus of claim 19, wherein the means for alerting a packet control unit is operative without movement to another cell.

22. A computer readable medium encoded with a software data structure sufficient for performing the functions of:

entering a dedicated mode in which a dual transfer mode capable mobile station is in a mobility management ready state and has a circuit switched connection;

alerting a packet control unit and a serving support node of entry into the dedicated mode, using a mobility management procedure, at least if said packet control unit and said serving support node are in a network supporting the dual transfer mode, wherein said dual transfer mode is a mode in which the mobile station may use a circuit switched and a packet switched radio resource substantially simultaneously, and wherein said packet control unit is a unit that substantially manages packet switched data instead of circuit switched data.

23. The computer readable medium of claim 22, arranged so the serving support node is alerted about the ongoing circuit switched connection subsequent to alerting the packet control unit.

24. The computer readable medium of claim 22, arranged so the alerting is performed by a mobility management cell update procedure even if the mobile station in ready state is not changing the cell.

* * * * *

UNITED STATES PATENT AND TRADEMARK OFFICE
CERTIFICATE OF CORRECTION

PATENT NO. : 7,450,540 B2  Page 1 of 1
APPLICATION NO. : 11/140494
DATED : November 11, 2008
INVENTOR(S) : Gronberg et al.

It is certified that error appears in the above-identified patent and that said Letters Patent is hereby corrected as shown below:

On the Title Page of the patent, at para. (60), please delete "May 27, 2005" and substitute --June 15, 2004-- therefor.

Signed and Sealed this

Tenth Day of February, 2009

JOHN DOLL
*Acting Director of the United States Patent and Trademark Office*